United States Patent
Puig et al.

(10) Patent No.: US 8,190,306 B2
(45) Date of Patent: May 29, 2012

(54) METHOD AND DEVICE FOR REDUCING ON AN AIRCRAFT THE EFFECTS OF A VERTICAL TURBULENCE

(75) Inventors: Stephane Puig, Lauzerville (FR); Romeo Byzery, Toulouse (FR)

(73) Assignee: Airbus Operations SAS, Toulouse (FR)

(*) Notice: Subject to any disclaimer, the term of this patent is extended or adjusted under 35 U.S.C. 154(b) by 646 days.

(21) Appl. No.: 12/368,177

(22) Filed: Feb. 9, 2009

(65) Prior Publication Data

US 2009/0314900 A1    Dec. 24, 2009

(30) Foreign Application Priority Data

Feb. 11, 2008 (FR) .................................. 08 00700

(51) Int. Cl.
*G05D 1/00* (2006.01)
(52) U.S. Cl. ........... 701/4; 701/16; 244/76 C; 244/76 R; 244/181; 244/194; 244/130
(58) Field of Classification Search .................. 701/3–5, 701/7, 8, 10–11, 16; 244/76 R, 76 C, 181–183, 244/194, 130
See application file for complete search history.

(56) References Cited

U.S. PATENT DOCUMENTS

| 4,591,113 | A   |   | 5/1986  | Mabey |
|-----------|-----|---|---------|-------|
| 6,188,330 | B1  | * | 2/2001  | Glover .......................... 340/968 |
| 6,289,289 | B1  |   | 9/2001  | Zweifel |
| 2008/0251648 | A1 |  | 10/2008 | Colomer |

FOREIGN PATENT DOCUMENTS

| EP | 0 127 963   | 12/1984 |
|----|-------------|---------|
| EP | 1 018 641   | 7/2000  |
| FR | 2 756 644   | 6/1998  |
| FR | 2 891 802   | 4/2007  |
| WO | 2007/042652 | 4/2007  |

OTHER PUBLICATIONS

Preliminary Search Report dated Dec. 19, 2008 w/ English translation.

* cited by examiner

*Primary Examiner* — Thomas G. Black
*Assistant Examiner* — Luke Huynh
(74) *Attorney, Agent, or Firm* — Dickinson Wright PLLC

(57) ABSTRACT

Disclosed is a method and device for attenuating vertical turbulence on an aircraft. The method and device involve calculating, by a calculating unit, based on a determined vertical wind component a first control order to control movement of at least one first controllable movable member that acts on aircraft lift, and a second control order that controls movement of at least one second controllable movable member to act on aircraft pitch. A verification unit verifies that activation conditions evidencing severe turbulence are in effect, the vertical turbulence being attenuated.

9 Claims, 2 Drawing Sheets

METHOD AND DEVICE FOR REDUCING ON AN AIRCRAFT THE EFFECTS OF A VERTICAL TURBULENCE

FIELD OF THE INVENTION

The present invention relates to a method and a device for attenuating on an aircraft, in particular a transport airplane, the effects engendered by at least one vertical turbulence encountered by this aircraft in the course of a flight.

BACKGROUND OF THE INVENTION

It is known that in the course of a flight, violent turbulence related to vertical wind gusts, can cause at the aircraft level:
- significant variations in vertical acceleration which, when they are negative, may injure the people in the aircraft;
- a significant swerve of the aircraft in terms of altitude, thereby increasing the risk of collision with another aircraft;
- spikes in the lift on the airfoil, which test the load limit of the latter; and
- discomfort in the cabin.

Two types of atmospheric turbulence are generally the cause of the disruption experienced by an aircraft, namely:
- clear sky turbulence, of CAT ("Clear Air Turbulence") type, which represents wind shears which often occur without any visible manifestation, generally above 15 000 feet (about 4500 meters). This clear sky turbulence which is of non-convective type, usually appears near the tropopause, especially above mountains and especially in winter. Such turbulence presents a natural risk in flight and can give rise to injuries to the passengers and flying personnel under certain particularly severe conditions. Moreover, such turbulence gives rise to additional fuel consumption (avoidance of the turbulence zone) and contributes to the fatigue of the aircraft and pilots; and
- convective turbulence which is often visible through the presence of clouds. Severe convective turbulence appears in fairly humid regions, so that a radar can generally detect it. So, most of the time, this phenomenon can be avoided by aircraft. However, it may happen that pilots are surprised or that they do not have time to evade a zone of convective turbulence. The severest turbulence appears in storm clouds, with ascending and descending currents that may reach several tens of meters per second. This convective turbulence is very localized and less extensive than clear sky turbulence.

Often, the above phenomena which are localized surprise both the crew of the aircraft and the embedded piloting systems, which do not have time to perform the appropriate maneuvers to attenuate the effects thereof which result therefrom at the aircraft level.

Patent applications FR-2 891 802 and WO-2007/042652 disclose a method and a device for attenuating on an aircraft the effects of at least one vertical turbulence encountered by this aircraft in the course of a flight.

This known method envisages implementing the following series of successive steps:
a) estimating a vertical component of the wind existing outside the aircraft at a current position of said aircraft;
b) with the aid of said vertical component of the wind, calculating:
- a first control order for at least one first controllable movable member, in particular a pair of spoilers, which is able to act on the lift of the aircraft, said first control order being such that it makes it possible to minimize the amplitude of the load factors engendered on the aircraft by the vertical turbulence; and
- a second control order for at least one second controllable movable member, preferably an elevator, which is able to act on the pitch of the aircraft, said second control order being intended to compensate for the pitch moment engendered by the control of said first movable member;
c) verifying, with the aid of activation logic, whether activation conditions evidencing severe turbulence are fulfilled; and
d) when said activation conditions are fulfilled, transmitting:
- said first control order to at least one actuator of said first controllable movable member; and
- said second control order to at least one actuator of said second controllable movable member.

Consequently, these patent applications FR-2 891 802 and WO-2007/042652 envisage acting on the lift of the aircraft, by way of said first movable member, so as to minimize the amplitude of the vertical load factor on the cabin of the aircraft. As regards the second movable member, it makes it possible to compensate for the pitch moment engendered by the control of this first movable member.

These documents FR-2 891 802 and WO-2007/042652 therefore disclose an embedded system for evaluating the level of severity of a vertical turbulence encountered by an aircraft and the deployment of logic using this severity level to automatically control a symmetric deflection of surfaces for directly controlling the lift (first movable members), as well as a deflection of the elevator (second movable member) to compensate for the effects of the pitch moment induced by these surfaces for directly controlling the lift.

The aforesaid known method which thus makes it possible to combat the abrupt variations in vertical load factor, engendered by the violent vertical turbulence of the aforesaid type, presents a few drawbacks, however. In particular:
- the envisaged activation logic is based on calculating a probability of occurrence which may be difficult to implement on an aircraft;
- the control of the lift, when it is carried out with the aid of a spoiler, is not symmetric, since the spoiler cannot be displaced about a middle position; and
- the calculation of the estimation of the wind proposed is not optimal.

Above all, this routine solution envisages using solely surfaces for directly controlling the lift (said first movable member or members) on the airfoil to reduce the vertical load factor at the aircraft cabin level. The load factor authority of this routine solution is therefore limited in effectiveness. The ensuing attenuation of the longitudinal effects, caused by vertical turbulence, is therefore not optimal.

SUMMARY OF THE INVENTION

The object of the present invention is to remedy these drawbacks. It comprises a method for carrying out optimized attenuation on an aircraft, in particular a transport airplane, of the effects of at least one vertical turbulence encountered by this aircraft in the course of a flight.

For this purpose, according to the invention, said method according to which:
a) a vertical component of the wind existing outside the aircraft at a current position of said aircraft is determined;
b) with the aid of said vertical component of the wind, are calculated:

a first control order for at least one first controllable movable member which is able to act on the lift of the aircraft, said first control order being such that it makes it possible to minimize the amplitude of the load factors engendered on the aircraft by the vertical turbulence; and a second control order for at least one second controllable movable member which is able to act on the pitch of the aircraft, said second control order being intended to compensate for the pitch moment engendered by the control of said first movable member;

c) a check is made to verify whether activation conditions evidencing severe turbulence are fulfilled; and d) when said activation conditions are fulfilled:
said first control order is transmitted to at least one actuator of said first controllable movable member; and
said second control order is transmitted to at least one actuator of said second controllable movable member, is noteworthy in that, moreover, in the course of the flight, the following series of successive steps is carried out in an automatic and iterative manner;

α) with the aid of said vertical component of the wind, a standard deviation of the wind is determined;

β) this standard deviation is compared with a predetermined threshold value, said threshold value being such that, if said standard deviation is greater than or equal to said threshold value, the frequency of the wind is less than that of the oscillation of the incidence of the aircraft, due to the wind;

γ) with the aid of current values of flight parameters, a second auxiliary control order is calculated for said second controllable movable member which is able to act on the pitch of the aircraft, said second auxiliary control order being intended to act indirectly on the lift at the level of the center of gravity of the aircraft so as to make it possible to increase the load factor authority; and δ) when, on the one hand, said activation conditions are fulfilled and, on the other hand, said standard deviation is greater than or equal to said threshold value, said second control order is transmitted to the actuator of said second movable member so that said second movable member is then subjected to a global control order corresponding to the sum of said second control order and of said second auxiliary control order.

Thus, by virtue of the invention, to attenuate the effects engendered on an aircraft by a vertical turbulence, in addition to controlling the first movable member or members which act directly on the lift of the aircraft, said second movable member which acts on the pitch is also controlled, doing so with the aim of increasing the load factor authority of the attenuation implemented by said first movable member or members. Consequently, by virtue of the invention, said second movable member carries out a dual function, namely:

a first function of compensating for the pitch moment (engendered by the control of the first movable member), as in the aforesaid routine solution; and a second function of indirect action on the lift at the level of the center of gravity of the aircraft so as to increase the load factor authority.

Through this increase in the load factor authority, the amplitude of the vertical load factor engendered by the vertical turbulence is minimized further than in the aforesaid routine solution. Increased and optimized attenuation of the effects engendered by the vertical turbulence is thus obtained.

Furthermore, this second function is only implemented when the frequency of the wind is less than that of the oscillation of the incidence of the aircraft, that is to say when the action of the second movable member is effective, as specified below.

Within the framework of the present invention, it is in particular possible to envisage:

as first movable member: a spoiler, an aileron, a flaperon, a slat, or a flap; and as second movable member: an aileron or preferably an elevator.

It will be noted that to modify the lift of an aircraft with airfoil control surfaces (spoilers, ailerons, etc.), it is necessary to control the deflection of at least one pair of such control surfaces, namely a control surface on each wing (these control surfaces being symmetric with respect to the fuselage of the aircraft).

Furthermore, to avoid overly abrupt modifications of vertical load factor, in an advantageous manner, when the activation conditions (which were fulfilled previously) no longer are, said control orders that are transmitted to said actuators are canceled progressively so as to obtain a progressive return of the movable members to their initial position.

Additionally, in an advantageous manner, in step α), the standard deviation of the wind $\sigma(k)$ is calculated with the aid of the following expressions:

$$\begin{cases} \sigma(k) = \sigma\max(k)/3 \\ \sigma\max(k) = pA \cdot |Wzo(k)| + (1-pA) \cdot |Wzo(k) - Wzo(k-2)|/2 \cdot Te \end{cases}$$

in which:
pA is a predetermined constant;
k is an integer;
Te is the sampling period;
$Wzo(k)$ is the vertical component of the wind in a geographical reference frame at an instant $k.Te$;
$\sigma(k)$ is the standard deviation of the wind at the instant $k.Te$; and
$\sigma\max(k)$ is the maximum of the wind at the instant $k.Te$.

Furthermore, advantageously, in step γ), said second auxiliary control order $\delta q\alpha wd$ (intended for an elevator) is calculated with the aid of the following expression:

$$\delta q\alpha wd = K.(s-mq).\alpha wd1/m\delta q$$

in which:
K is a predetermined constant;
$mq$ and $m\delta q$ are predetermined coefficients; and
$\alpha wd1$ is the derivative of the incidence of the aircraft, induced by the wind.

Additionally, in a particular embodiment, in step c):

c1) the vertical component of the wind, taken in a reference frame tied to the aircraft, is translated into an angle of incidence, and the dynamic component of this angle of incidence is determined;

c2) a current threshold value which depends on the mass, the current speed and the current altitude of the aircraft is determined; and c3) said dynamic component of the angle of incidence is compared with said current threshold value, and it is concluded that the activation conditions evidencing severe turbulence are fulfilled, when said dynamic component of the angle of incidence is greater than said current threshold value.

Activation logic is thus obtained which can easily be implemented on an aircraft, in contradistinction to the aforesaid routine solution.

In a preferred embodiment, at least one pair of spoilers are used as first movable members. However, a spoiler is a nonsymmetric control surface so that it can modify the lift solely in one direction when it is actuated. It is, consequently, not possible to choose between a control of the spoiler that increases the lift and a control of the spoiler that decreases the lift. So, to remedy this drawback, in this preferred embodiment:

- an initial deflection of said spoiler (in the event of detecting a vertical turbulence) is carried out so as to bring it to an intermediate deflection position; and
- said first control order is applied to said spoiler with respect to this intermediate deflection position.

Thus, through this initial deflection of the spoiler to an intermediate position (which corresponds for example to a quarter of the maximum range of swing of the spoiler), it is possible to control the displacement of the spoiler in one direction or the other with respect to this intermediate deflection position. It is therefore possible either to decrease, or to increase, the initial lift (before applying a control order) which is representative of this intermediate deflection position.

Furthermore, when the aircraft is furnished with an automatic piloting system, the reaction of the automatic piloting system to an action in accordance with the invention for attenuating the effects of a turbulence, can, in certain cases, lead to a phase shift with respect to the phenomenon and therefore to a degradation of the flight conditions. So, to remedy this drawback, in an advantageous manner, when at the moment where the activation conditions evidencing severe turbulence are fulfilled, the automatic piloting system is engaged, the authority of said automatic piloting system is limited.

The present invention also relates to a device for attenuating on an aircraft, for example a transport airplane, the effects of at least one vertical turbulence encountered by this aircraft in the course of a flight.

According to the invention, the device of the type comprising:

- at least one first controllable movable member which is able to act on the lift of the aircraft;
- at least one second controllable movable member which is able to act on the pitch of the aircraft;
- means for determining a vertical component of the wind existing outside the aircraft at a current position of said aircraft;
- means for automatically calculating, with the aid of said vertical component of the wind:
  - a first control order for said first controllable movable member, said first control order being such that it makes it possible to minimize the amplitude of the load factors engendered on the aircraft by the vertical turbulence; and
  - a second control order for said second controllable movable member, said second control order being intended to compensate for the pitch moment engendered by the control of said first movable member;
- verification means for verifying whether activation conditions evidencing severe turbulence are fulfilled; and
- transmission means for automatically transmitting when said activation conditions are fulfilled:
  - said first control order to at least one actuator of said first controllable movable member; and
  - said second control order to at least one actuator of said second controllable movable member, is noteworthy in that:

it comprises, moreover:

- means for determining, with the aid of said vertical component of the wind, a standard deviation of the wind;
- means for comparing this standard deviation with a predetermined threshold value, said threshold value being such that, if said standard deviation is greater than or equal to said threshold value, the frequency of the wind is less than that of an oscillation of the incidence of the aircraft, due to the wind; and
- means for calculating, with the aid of current values of flight parameters, a second auxiliary control order for said second controllable movable member, said second auxiliary control order being intended to act indirectly on the lift at the level of the center of gravity of the aircraft so as to make it possible to increase the load factor authority; and said transmission means automatically transmit, when, on the one hand, said activation conditions are fulfilled and, on the other hand, said standard deviation is greater than or equal to said threshold value, said second control order to the actuator of said second movable member so that said second movable member is then subjected to a global control order corresponding to the sum of said second control order and of said second auxiliary control order.

The device in accordance with the present invention therefore makes it possible to attenuate, in an optimal manner, the amplitude of the vertical load factor engendered by a vertical turbulence, and to do so at any point of the aircraft. It also makes it possible to reduce altitude variations, if any.

Moreover, this device in accordance with the invention has the advantage of being able to be installed on any type of aircraft (military, civil, commercial) which is furnished both with at least one first movable member (spoiler, aileron, etc.) of arbitrary type having an effect on the lift, and at least one second movable member (elevator, aileron) of arbitrary type having an effect on the pitch.

The figures of the appended drawing will elucidate the manner in which the invention may be embodied. In these figures, identical references designate similar elements.

DETAILED DESCRIPTION OF THE INVENTION

Figure 1:
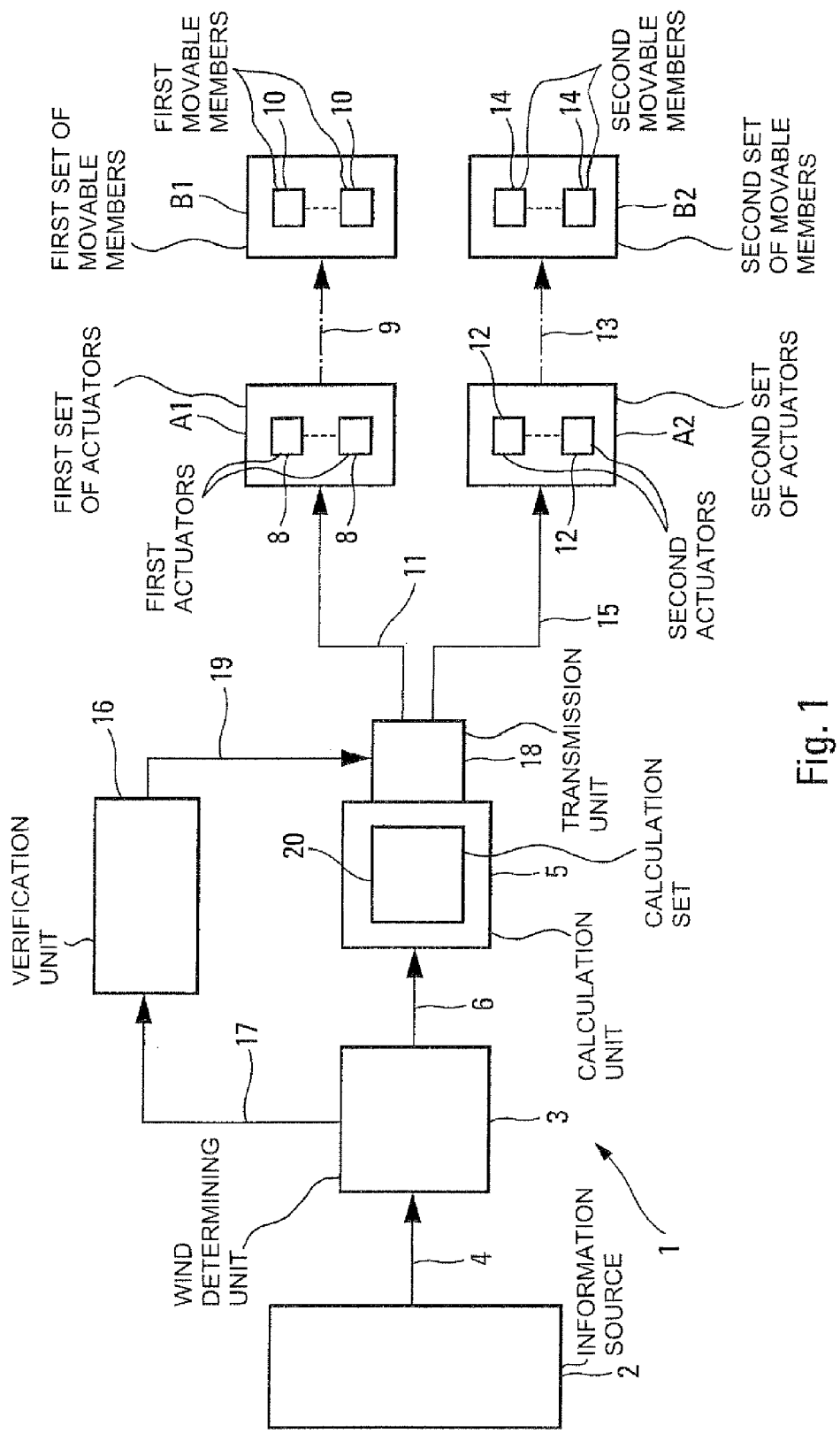
FIG. 1 is the schematic diagram of a device in accordance with the invention.

The device 1 in accordance with the invention and represented schematically in FIG. 1, is intended to attenuate on an aircraft (not represented), for example a transport airplane, the effects of at least one vertical turbulence encountered by this aircraft in the course of a flight.

It is known that turbulence corresponds to an agitation of the air which is superimposed on the mean motion of the air and which consists of haphazard motions, in continual transformation. Turbulence is encountered in the interior or in the vicinity of clouds (for example in a storm cloud where oppositely directed vertical currents coexist). There also exists clear sky turbulence, either near the ground, or especially at very high altitude in proximity to jet streams.

Accordingly, said device 1 comprises:
- a set 2 of information sources, which comprise routine means for measuring (or calculating), during a flight, the current values of aircraft parameters, specified below;
- means 3 which are connected by way of a link 4 to said set 2 of information sources and which are formed so as to determine a vertical component of the wind existing outside the aircraft, at a current position of said aircraft;
- a calculation unit 5 which is connected by way of a link 6 to said means 3 and which is formed so as to calculate, with the aid of said vertical wind component received from said means 3:
  - a first control order for at least one first controllable movable member 10 (or control surface) specified below, which is able to act on the lift of the aircraft. This first control order is such that it makes it possible to minimize the amplitude of the load factors engendered on the aircraft by the vertical turbulence; and
  - a second control order for at least one second controllable movable member 14 (or control surface) specified below, which is able to act on the pitch of the aircraft. This second control member is such that applied to said second movable member 14, it makes it possible in particular to compensate for the pitch moment engendered by the control of said first movable member 10;
- a set A1 of actuation means 8 which are able to actuate, that is to say to displace, as illustrated by a chain-dotted link 9, at least one first movable member 10 forming part of a set B1. Said set B1 can comprise one or more first movable members 10 specified below. Said set A1 receives said first control order by way of a link 11 from said calculation unit 5, and the actuation means 8 displace said first movable member or members 10 of said set B1, in a routine manner, in accordance with said first control order;
- a set A2 of actuation means 12 which are able to actuate, that is to say to displace, as illustrated by a chain-dotted link 13, at least one second movable member 14 forming part of a set B2. Said set B2 can comprise one or more second movable members 14 specified below. Said set A2 receives the second control order by way of a link 15 from said calculation unit 5, and its actuation means 12 displace the second movable member or members 14 of said set B2, in a routine manner, in accordance with said second control order;
- verification means 16 which are connected by way of a link 17 to said means 3 and which are formed so as to verify whether or not activation conditions specified below, which evidence a severe turbulence, are fulfilled; and
- transmission means 18 which are associated with said calculation unit 5 and which are formed so as to automatically transmit said first and second control orders to said sets A1 and A2, solely when said verification means 16 have forewarned them by way of a link 19 that the activation conditions are fulfilled.

It will be noted that, to modify the lift of an aircraft whose first movable members 10 are mounted on wings of the aircraft, it is necessary to control the deflection of (at least) a pair of such first movable members 10, namely a movable member per wing, these first movable members being symmetric with respect to the fuselage of the aircraft.

Figure 2:
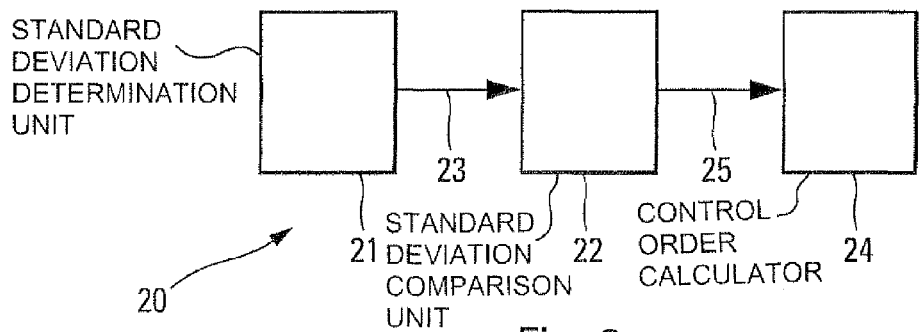
FIG. 2 schematically shows a particular exemplary embodiment of means forming part of a device in accordance with the invention.

According to the invention, in particular to optimize the attenuation (of the effects of a turbulence) implemented by said device 1, the latter comprises, moreover, a set 20 which can, for example, be integrated into the calculation unit 5 and which comprises, as represented in FIG. 2:
- means 21 for determining, with the aid of said vertical wind component received from said means 3, a standard deviation of the wind;
- means 22 which are connected by way of a link 23 to said means 21 and which are formed so as to compare this standard deviation with a predetermined threshold value. This threshold value is such that, if said standard deviation is greater than or equal to said threshold value, the frequency of the wind is less than that of the oscillation of the incidence of the aircraft;
- means 24 which are connected by way of a link 25 to said means 22 and which are formed so as to calculate, with the aid of current values of flight parameters, a second auxiliary control order for said second controllable movable member (or members) 14. This second auxiliary control order is intended to allow said second movable member (or members) 14 to act indirectly on the lift at the level of the center of gravity of the aircraft so as to increase the load factor authority.

Moreover, according to the invention, said transmission means 18 are formed so as to automatically transmit said second control order to the actuator (or to the actuators) 12 of said second movable member (or members) 14 when, on the one hand, said activation conditions are fulfilled and, on the other hand, said standard deviation is greater than or equal to said threshold value. Said second movable member 14 is then subjected to a global control order corresponding to the sum of said second control order and of said second auxiliary control order.

Thus, to attenuate the effects engendered on an aircraft by a vertical turbulence, the device 1 in accordance with the invention envisages controlling not only the first movable member or members 10 which act directly on the lift of the aircraft, but also the or said second movable member (or members) 14 which acts (or act) on the pitch, doing so with the aim of increasing the load factor authority of the attenuation implemented by said first movable member or members 10. Consequently, by virtue of the invention, said second movable member (or members) carries out (carry out) a dual function, namely:
- a first routine function of compensating for the pitch moment (engendered by the control of the first movable member or members 10); and
- a second function of indirect action on the lift at the level of the center of gravity of the aircraft so as to increase the load factor authority.

Through this increase in the load factor authority, the device 1 is able to further minimize the amplitude of the vertical load factor engendered by the vertical turbulence. Increased and optimized attenuation of the effects engendered by the vertical turbulence is obtained thus.

Furthermore, this second function is only implemented when the frequency of the wind is less than that of the oscillation of the incidence of the aircraft, that is to say when the action of the second movable member or members 14 is effective, as specified below.

Figures 3, 4:
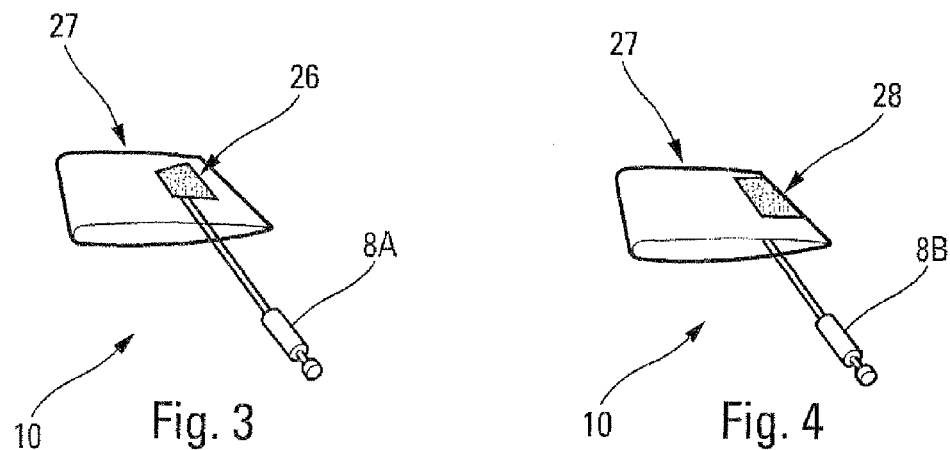
FIGS. 3, 4 and 5 schematically show various examples of controllable movable members of an aircraft, which are able to be employed in a device in accordance with the invention.

Within the framework of the present invention, said set B1 can comprise as first movable member 10:
- at least one spoiler 26 which is mounted on a wing 27 of the aircraft and which is associated with a routine actuator 8A, as represented in FIG. 3; and/or at least one aileron 28 which is also mounted on a wing 27 of the aircraft and which is associated with a routine actuator 8B, as represented in FIG. 4; and/or at least one routine flaperon (not represented); and/or at least one routine slat (not represented); and/or at least one routine flap (not represented).

Figure 5:
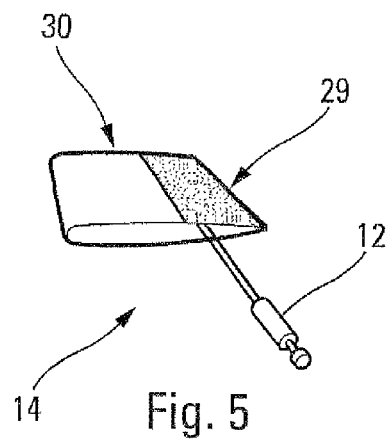

Moreover, said set B2 comprises, preferably, as second movable member 14, a routine elevator 29 which is mounted on a horizontal tailplane 30 of the aircraft and which is associated with a routine actuator 12, represented in FIG. 5.

The device 1 in accordance with the invention is intended to attenuate, in real time, the load factor variations induced by a turbulence, and especially to avoid negative excursions in load factor (negative vertical accelerations) at any point of the cabin, that is to say at one and the same time in proximity to the center of gravity, at the front and at the rear of the aircraft.

In a known manner, the longitudinal linearized equations of the aircraft give for the lift force and the pitch moment:

$$\begin{pmatrix} \alpha 1 \\ q 1 \end{pmatrix} = \begin{pmatrix} p\alpha & 1 \\ m\alpha & mq \end{pmatrix} \cdot \begin{pmatrix} \alpha \\ q \end{pmatrix} + \begin{pmatrix} p\delta s & p\delta q \\ m\delta s & m\delta q \end{pmatrix} \cdot \begin{pmatrix} \delta s \\ \delta q \end{pmatrix} + \begin{pmatrix} p\alpha wd \\ m\alpha wd \end{pmatrix} \cdot \alpha wd$$

in which the following parameters are found:

α the incidence of the aircraft;

α1 the derivative of the incidence with respect to time;

q the angular pitch rate;

q1 the derivative with respect to time of the angular pitch rate;

pα, md and mq the linearized coefficients of the dynamic matrix;

δs the symmetric deflection of the control surfaces (or movable members) on the airfoil;

pδs and mδs the associated effectivenesses (at δs) in terms of lift and pitch;

δq the deflection of the pitch surfaces (second movable members 14);

pδq and mδq the associated effectivenesses (at δq) in terms of lift and pitch;

αwd the aircraft incidence, which is induced by the wind; and pαwd and mαwd the associated effectivenesses (at αwd) in terms of lift and pitch with:

$$\begin{cases} p\alpha wd = -p\alpha \\ m\alpha wd = -m\alpha \end{cases}$$

According to the invention, the effects of the wind on the derivative of the incidence and the angular pitch rate are countered by the movable members (Δα1=0, Δq1=0).

The calculation of the wind, implemented by the means 3, makes it necessary to know:

the following magnitudes provided by the aircraft's routine inertial platforms, forming part of said set 2:

the accelerations of the aircraft in relation to the roll, pitch and yaw axes of the aircraft;

the ground speed vector with the North-South speed, the East-West speed, and the vertical speed;

the angles of attitude φ, θ and ψ; and the associated angular rates p, q and r respectively of roll, pitch and yaw; and the following magnitudes provided by routine anemometric sensors of the aircraft, also forming part of said set 2:

the air speed;

the incidence α; and the sideslip β if it is measurable, otherwise an estimate.

The three components of the wind are calculated, in a routine manner, in a reference frame tied to the aircraft, on the basis of the ground speed, air speed, angles of attitude, incidence and sideslip. This reference frame tied to the aircraft comprises in a routine manner:

a first axis which is defined according to the longitudinal axis of the aircraft;

a second axis which is orthogonal to this first axis and which passes through the mid-plane of the wings of the aircraft; and a third axis which is perpendicular to the plane formed by said first and second axes and which passes by the center of gravity of the aircraft.

The components of the wind are thereafter transposed, in a routine manner, from the reference frame tied to the aircraft to a routine terrestrial reference frame. Two horizontal components (North, East) and a vertical component are consequently retrieved. The calculation of the wind does not therefore require any specific sensor.

Additionally, according to the invention, said activation means 16 comprise elements (integrated and not represented) for respectively:

translating the vertical component of the wind, taken in the reference frame tied to the aircraft, into an angle of incidence, and determining the dynamic component of this angle of incidence;

determining a current threshold value which depends on the mass, the current speed, and the current altitude of the aircraft; and comparing said dynamic component of the angle of incidence with said current threshold value, and concluding that the activation conditions evidencing severe turbulence are fulfilled, when said dynamic component of the angle of incidence is greater than said current threshold value.

A risk of severe turbulence therefore exists when the dynamic component of the incidence αwd due to the wind is greater than a threshold value (of incidence) αwdseuil. An activation Boolean is therefore defined by the activation means 16, which is such that it becomes equal to 1, when:

$$[(\tau.s)/(1+\tau.s)].\alpha wd > \alpha wdseuil$$

with:

τ the time constant of the filter removing the static part of the signal (namely the vertical component of the wind); and s the Laplace variable.

This information is used to modify the gains of the flight control laws and to dispatch specific orders to the movable members (or control surfaces), during the time where the detection is active and where the aircraft is crossing the turbulence.

Said threshold value αwdseuil is determined by tables which depend on the mass, the speed and the altitude of the aircraft. These tables are defined beforehand by aircraft response simulations, making it possible to determine the incidence of the wind from which the vertical acceleration of the aircraft will exceed a particular value, for example 0.3 g, in the near future (of the order of a second for example).

The aforesaid activation logic, used by the activation means 16, can be easily implemented by an aircraft.

Additionally, from the estimation of the vertical wind in the geographical reference frame (or terrestrial reference frame), the means 21 estimate the standard deviation of the wind in real time, a positive real quantity characterizing the distribution of the wind about its mean. For this purpose, said means 21 determine a value corresponding to a current maximum, on the basis of the propagation over a very short time of the current value of the vertical wind. This maximum is calculated over a sliding window of a few hundred milliseconds. If Gaussian magnitudes are considered, it is possible to define this maximum as being equal to three times the standard deviation. So, in a preferred embodiment, said means 21 calculate the standard deviation of the wind $\sigma(k)$ with the aid of the following expressions:

$$\begin{cases} \sigma(k) = \sigma\max(k)/3 \\ \sigma\max(k) = pA \cdot |Wzo(k)| + (1-pA) \cdot |Wzo(k) - Wzo(k-2)|/2 \cdot Te \end{cases}$$

in which:
- pA is a predetermined constant, which lies between 0 and 1 for weighting the addition of a propagation term to the wind;
- k is an integer;
- Te is the sampling period;
- $Wzo(k)$ is the vertical component of the wind in the geographical (or terrestrial) reference frame at an instant $k.Te$;
- $\sigma(k)$ is the standard deviation of the wind at the instant $k.Te$; and
- $\sigma\max(k)$ is the maximum of the wind at the instant $k.Te$.

According to the Kolmogorov or Von Karman assumptions, it is possible to ascertain spectral templates for severe turbulence (amplitude-frequencies). The energy is transferred from the biggest vortices to the smallest vortices. The amplitude of a wind gust is therefore proportional to its length and inversely proportional to its frequency. It is therefore possible to define standard deviation values for severe turbulence for frequency ranges.

The elevators 29 being effective only for wind frequencies which correspond to the oscillation of incidence, the objective is to be able to define, without filtering the wind (which would create delay and would therefore degrade the conditions . . . ), if the wind is in a range below the oscillation of incidence or in a higher range.

A threshold standard deviation ($\sigma$seuil) is therefore used which makes it possible to assume that, when the standard deviation $\sigma(k)$ of the wind (calculated in the aforesaid manner) is greater than this threshold standard deviation $\sigma$seuil, the wind is in the range below the oscillation of incidence and the use of the elevator or elevators 29 may prove to be effective.

On the other hand, when the standard deviation $\sigma(k)$ of the wind is less than the threshold standard deviation $\sigma$seuil, the elevators 29 are no longer effective and, in this case, the transmission means 18 dispatch solely orders to the surfaces for directly controlling the lift of the wing 27 so as to control the lift. In this situation, the elevator or elevators 29 are used solely to compensate for the pitch effects (with the aid of the aforesaid second control order).

It is also possible to filter the high frequencies with a low-pass filter to avoid using control surfaces which would not have the sought-after effects at higher frequencies.

Consequently, according to the invention, the global control order which is transmitted to the second movable member (or members) 14 is equal to the sum:
- of an order $\delta q$comp (namely said aforesaid second control order) which is dependent on the wind, the first control order [intended for the first movable member(s) 10 acting directly on the lift], and the altitude, the speed and the centering to control the pitch moment in terms of dynamics. One part of this moment is induced by the wind and another by the first movable member(s) 10 ($\Delta q1=0$); and
- of an order $\delta q\alpha$wd (namely said aforementioned second auxiliary control order) which is dependent on the derivative with respect to time of the incidence induced by the wind, the centering, the altitude and the speed to reduce the excursions in terms of load factor at the center of gravity ($\Delta Nzcg=0$). However, this order is activatable solely for low wind frequencies ($\sigma(k) \geqq \sigma$seuil).

In the case where one or more elevators 29 is(are) used as second movable member (or members) 14, said means 24 calculate said second auxiliary control order $\delta q\alpha$wd with the aid of the following expression:

$$\delta q\alpha wd = K.(s-mq).\alpha wd1/m\delta q$$

in which:
- K is a predetermined constant, which lies between 0 and 1 for preserving sufficient stability of the system and for instituting a compromise between the balancing of the pitch and the gain in terms of load factor at the center of gravity of the aircraft;
- mq and m$\delta$q are predetermined coefficients; and
- $\alpha$wd1 is the derivative (with respect to time) of the incidence of the aircraft $\alpha$wd, induced by the wind.

Moreover, said calculation unit 5 calculates said second control order $\delta q$comp with the aid of the following expression:

$$\delta q comp = (m\alpha/m\delta q).\alpha wd - (m\delta p/m\delta q).\delta sp$$

It will be noted that an elevator 29 does not exhibit any effectiveness in terms of lift, since it is situated on the rear horizontal tailplane 30.

In a preferred embodiment, at least one spoiler 26 is used as first movable member 10. However, a spoiler 26 is a non-symmetric control surface so that it can modify the lift only in one direction when it is actuated. It is, consequently, not possible to choose between a control of the spoiler that increases the lift and a control of the spoiler that decreases the lift. So, to remedy this drawback, in this preferred embodiment:
- an initial deflection of said spoiler 26 (in the event of detecting a vertical turbulence) is carried out so as to bring it to an intermediate deflection position; and
- said first control order is applied to said spoiler 26 with respect to this intermediate deflection position.

An order proportional to the wind makes it possible to construct the order $\delta sp$ to be dispatched in a symmetric manner about the intermediate position. A phase advance modulated by the effectiveness ratio between the wind and the first movable members 10 (for directly controlling the lift) is applied to the orders, thus obtaining:

$$\delta sp = \delta sp0 + (p\alpha/p\delta sp).((1+a.\tau.s)/(1+\tau.s)).\alpha wd$$

with:
- $\delta sp0$ the intermediate predeflection position ($\delta sp0$ is greater than 0); and
- $a$ and $\tau$ characteristic parameters of the phase advance, which are greater than zero.

Thus, through this initial deflection of the spoiler 26 to an intermediate position (which corresponds for example to a quarter of the maximum range of swing of the spoiler 26), it is possible to control the displacement of the spoiler 26 in one direction or the other with respect to this intermediate deflection position. It is therefore possible either to decrease, or to increase, the initial lift (before applying a control order) which is representative of this intermediate deflection position.

When the activation Boolean of the turbulence falls back to zero, all the orders are progressively canceled, and the spoiler or spoilers 26 return progressively to a neutral position. This order makes it possible to control the lift variations induced by the wind, that is to say:

$$\Delta\alpha 1=0$$

Furthermore, when the aircraft is furnished with an automatic piloting system (not represented), the reaction of the automatic piloting system to an action in accordance with the invention for attenuating the effects of a turbulence, may give rise, in certain cases, to a phase shift with respect to the phenomenon and therefore to a degradation of the flight conditions. So, to remedy this drawback, the device 1 comprises means (not represented) for limiting the authority of said automatic piloting system, when at the moment where the activation conditions evidencing severe turbulence are fulfilled said automatic piloting system is engaged.

The device 1 in accordance with the present invention therefore makes it possible to attenuate, in an optimal manner, the amplitude of the vertical load factor engendered by a vertical turbulence, doing so at any point of the aircraft. It also makes it possible to reduce altitude variations, if any.

Moreover, this device 1 in accordance with the invention has the advantage of being able to be installed on any type of aircraft (military, civil, commercial) which is furnished at one and the same time with at least one first movable member 10 (spoiler, aileron, etc.) of arbitrary type having an effect on the lift, and at least one second movable member 14 (elevator) of arbitrary type having an effect on the pitch.

The invention claimed is:

1. A method for attenuating vertical turbulence on an aircraft during flight, the method comprising the steps of:
   a) determining, by a wind determining unit, a vertical wind component existing outside the aircraft at a current position of said aircraft;
   b) calculating, by a calculating unit, based on the determined vertical wind component:
      a first control order to control movement of at least one first controllable movable member to act on aircraft lift, said first control order minimizing amplitude of vertical turbulence load factors on the aircraft due to vertical turbulence; and
      a second control order to control movement of at least one second controllable movable member to act on aircraft pitch, said second control order compensating for pitch moment of the aircraft due to the movement control of said first movable member;
   c) verifying, by a verification unit, activation conditions evidencing severe turbulence are in effect; wherein
      said first control order is transmitted to at least one actuator of said first controllable movable member;
      said second control order is transmitted to at least one actuator of said second controllable movable member, and
   in the course of the flight, the following series of successive steps is carried out:
      α) determining, based on the determined vertical wind component, a standard deviation of the wind;
      β) comparing the determined standard deviation with a predetermined threshold value, said threshold value being such that, when the determined standard deviation is greater than or equal to said threshold value, the frequency of the wind is less than that of an oscillation of the incidence of the aircraft, due to the wind;
      γ) calculating, based on current flight parameter values, a second auxiliary control order to control said second controllable movable member to act on the aircraft pitch, said second auxiliary control order acting indirectly on the aircraft lift at a center of gravity of the aircraft to increase the load factor amplitude; and
      δ) transmitting, when said standard deviation is greater than or equal to said threshold value, said second control order to the actuator of said second movable member so that said second movable member is subjected to a global control order corresponding to a sum of said second control order and of said second auxiliary control order.

2. The method as claimed in claim 1,
   wherein in step α), the standard deviation of the wind σ(k) is calculated according to the following expressions:

$$\sigma(k) = \sigma\max(k)/3$$
$$\sigma\max(k) = pA \cdot |Wzo(k)| + (1-pA) \cdot |Wzo(k) - Wzo(k-2)|/2 \cdot Te$$

in which: pA is a predetermined constant;
k is an integer;
Te is the sampling period;
Wzo(k) is the vertical component of the wind in a geographical reference frame at an instant k.Te;
σ(k) is the standard deviation of the wind at the instant k.Te; and
σ max(k) is the maximum of the wind at the instant k.Te.

3. The method as claimed in claim 1,
   wherein in step γ), said second auxiliary control order δqαwd is calculated according to the following expression:

$$\delta q\alpha wd = K \cdot (s-mq) \cdot \alpha wd1/m\delta q$$

in which: K is a predetermined constant;
mq and mδq are predetermined coefficients; and
αd1 is the derivative of the incidence of the aircraft, induced by the wind.

4. The method as claimed in claim 1,
   wherein in step c):
   c1) the vertical component of the wind, taken in a reference frame tied to the aircraft, is translated into an angle of incidence, and a dynamic component of the angle of incidence is determined;
   c2) a current threshold value which depends on mass, current speed and current altitude of the aircraft is determined; and
   c3) said dynamic component of the angle of incidence is compared with said current threshold value, and it is concluded that activation conditions evidencing severe turbulence are fulfilled, when said dynamic component of the angle of incidence is greater than said current threshold value.

5. The method as claimed in claim 1, wherein:
   said first controllable movable member is an aircraft spoiler;
   an initial deflection of said spoiler is carried out so as to bring the spoiler to an intermediate deflection position; and
   said first control order is applied to said spoiler with respect to the intermediate deflection position.

6. The method as claimed in claim 1,
wherein, when at activation conditions evidencing severe turbulence are fulfilled, authority of an automatic piloting system is limited.

7. The method as claimed in claim 1,
wherein, when activation conditions are terminated, said control orders that are transmitted to said actuators are canceled.

8. A device for attenuating vertical turbulence on an aircraft during flight, said device (1) comprising:
- at least one first controllable movable member that acts on aircraft lift;
- at least one second controllable movable member that acts on aircraft pitch;
- wind determining unit that determines a vertical wind component existing outside the aircraft at a current position of said aircraft;
- calculation unit that calculates, based on said vertical wind component:
  - a first control order to control movement of at least one first controllable movable member to act on aircraft lift, said first control order minimizing amplitude of vertical turbulence load factors on the aircraft due to vertical turbulence; and
  - a second control order to control movement of at least one second controllable movable member to act on aircraft pitch, said second control order compensating for pitch moment of the aircraft due to the movement control of said first movable member;
- verification unit that verifies activation conditions evidencing severe turbulence are in effect; and
- transmission unit that transmits:
  - said first control order to at least one actuator of said first controllable movable member; and
  - said second control order to at least one actuator of said second controllable movable member,
wherein:
said device further comprises:
- standard deviation determination unit that determines, based on said vertical wind component, a standard deviation of the wind;
- standard deviation comparison unit that compares the this standard deviation with a predetermined threshold value, said threshold value being such that, when said standard deviation is greater than or equal to said threshold value, wind frequency is less than that of an oscillation of the incidence of the aircraft, due to the wind; and
- control order calculator that calculates, based on current flight parameter values, a second auxiliary control order for said second controllable movable member, said second auxiliary control order acting indirectly on the aircraft lift at a center of gravity of the aircraft to increase the load factor amplitude; and
said transmission unit transmits, when said activation conditions are fulfilled and said standard deviation is greater than or equal to said threshold value, said second control order to the actuator of said second movable member so that said second movable member is subjected to a global control order corresponding to a sum of said second control order and of said second auxiliary control order.

9. An aircraft, which comprises the device of claim 8.

* * * * *